United States Patent
Baseeth et al.

(10) Patent No.: US 8,846,126 B2
(45) Date of Patent: Sep. 30, 2014

(54) FOOD COMPOSITIONS COMPRISING ORGANOGELS

(75) Inventors: Shireen S. Baseeth, Decatur, IL (US); Bruce R. Sebree, Oakley, IL (US)

(73) Assignee: Archer Daniels Midland Company, Decature, IL (US)

( * ) Notice: Subject to any disclaimer, the term of this patent is extended or adjusted under 35 U.S.C. 154(b) by 0 days.

(21) Appl. No.: 13/376,864

(22) PCT Filed: May 13, 2011

(86) PCT No.: PCT/US2011/036448
§ 371 (c)(1),
(2), (4) Date: Sep. 14, 2012

(87) PCT Pub. No.: WO2011/143566
PCT Pub. Date: Nov. 17, 2011

(65) Prior Publication Data
US 2013/0095221 A1  Apr. 18, 2013
US 2014/0242246 A9  Aug. 28, 2014

Related U.S. Application Data

(63) Continuation-in-part of application No. 13/128,530, filed as application No. PCT/US2009/064407 on Nov. 13, 2009.

(60) Provisional application No. 61/114,510, filed on Nov. 14, 2008, provisional application No. 61/334,766, filed on May 14, 2010.

(51) Int. Cl.
| | |
|---|---|
| A23D 9/00 | (2006.01) |
| A23L 1/05 | (2006.01) |
| A21D 2/16 | (2006.01) |
| A21D 13/00 | (2006.01) |
| A23K 1/16 | (2006.01) |
| A23D 7/01 | (2006.01) |
| A23G 3/34 | (2006.01) |
| A23J 7/00 | (2006.01) |
| A23L 1/00 | (2006.01) |
| A23L 1/035 | (2006.01) |
| A21D 2/32 | (2006.01) |

(52) U.S. Cl.
CPC .......... *A23L 1/035* (2013.01); *A21D 2/165* (2013.01); *A21D 13/0058* (2013.01); *A21D 9/013* (2013.01); *A21D 7/013* (2013.01); *A21D 2/16* (2013.01); *A23K 1/164* (2013.01); *A23D 7/011* (2013.01); *A23G 3/346* (2013.01); *A23J 7/00* (2013.01); *A23L 1/0055* (2013.01); *A23V 2002/00* (2013.01); *A21D 2/32* (2013.01)
USPC .............................. 426/573; 426/602

(58) Field of Classification Search
USPC ............................... 426/602, 573
See application file for complete search history.

(56) References Cited

U.S. PATENT DOCUMENTS

| | | |
|---|---|---|
| 4,241,046 A | 12/1980 | Papahadjopoulos et al. |
| 4,708,861 A | 11/1987 | Popescu et al. |
| 4,855,152 A | 8/1989 | Nakano et al. |
| 5,968,583 A | 10/1999 | Gautchier et al. |
| 6,316,428 B1 | 11/2001 | Crandall et al. |
| 6,368,653 B1 | 4/2002 | Heertje et al. |
| 6,846,507 B1 | 1/2005 | Ritter et al. |
| 6,858,666 B2 | 2/2005 | Hamer et al. |
| 7,357,957 B2 | 4/2008 | Marangoni et al. |
| 7,718,210 B2 | 5/2010 | Marangoni et al. |
| 2001/0016663 A1 | 8/2001 | Ghyczy et al. |
| 2003/0211217 A1 | 11/2003 | Milani et al. |
| 2005/0196434 A1 | 9/2005 | Brierre et al. |
| 2005/0287180 A1* | 12/2005 | Chen ............................ 424/400 |
| 2006/0078577 A1 | 4/2006 | Dechow et al. |
| 2006/0110342 A1 | 5/2006 | Dechow et al. |
| 2007/0009643 A1* | 1/2007 | Baseeth et al. ................ 426/601 |
| 2007/0298002 A1 | 12/2007 | Barone et al. |
| 2008/0014252 A1 | 1/2008 | DelPrete et al. |
| 2009/0285869 A1 | 11/2009 | Trimble et al. |

FOREIGN PATENT DOCUMENTS

| | | |
|---|---|---|
| BR | 0314065-2 A1 | 7/2005 |
| DE | 4003783 A1 | 8/1991 |
| DE | 19940227 A1 | 3/2001 |
| EP | 0099039 A1 | 7/1983 |
| EP | 0162724 A2 | 11/1985 |
| EP | 0395765 A1 | 11/1990 |
| EP | 1655020 A1 | 5/2006 |
| RU | 2331407 C1 | 11/2006 |
| WO | 9853800 A1 | 12/1998 |
| WO | 0209672 A1 | 2/2002 |
| WO | 02072591 A2 | 9/2002 |
| WO | 2006042059 A1 | 4/2006 |
| WO | 2007054197 A1 | 5/2007 |
| WO | 2010057007 A1 | 5/2010 |

OTHER PUBLICATIONS

Kumar et al, Lecithin Organogels as a Potential Phospholipid-Structured System for Topical Drug Deivery: A Review, AAPS PharmSciTech, Oct. 6, 2005, 6 (2) Article 40, pp. E298-E310, India.
Duffy et al, Organogel-Based Emulsion Systems, Micro-Structural Features and Impact on In Vitro Digestion, J Am Oil Chem Soc, Apr. 26, 2009, pp. 1-9, USA.
Scartazzini et al, Organogels from Lecithins, J. Phys. Chem. 1988, vol. 92, No. 3, pp. 829-833, Switzerland.
Shchipunov et al, Self-organising structures of Lecithin, Russian Chemical Reviews 66, 1997, (4), pp. 301-322.
Archer Daniels Midland Co., Thermolec 200 Lecithin, Product Code: 700407, May 2008, p. 1, specialtyingredients@admworld.com, USA.
Archer Daniels Midland Co., Thermolec WFC Lecithin, Product Code: 700409, Apr. 2008, p. 1, specialtyingredients@admworld.com, USA.

(Continued)

*Primary Examiner* — Carolyn Paden
(74) *Attorney, Agent, or Firm* — Andrew F. Nilles

(57) ABSTRACT

The present invention is directed towards organogel compositions. Processes for producing such organogel compositions are further disclosed. The present invention is also directed towards uses of the novel organogel compositions in foods, beverages, nutraceuticals pharmaceuticals, pet food, or animal feed.

15 Claims, 7 Drawing Sheets

(56) References Cited

OTHER PUBLICATIONS

Archer Daniels Midland Co., Ultralec F Deoiled Lecithin, Product Code: 700852, Mar. 2008, p. 1, specialtyingredients@admworld.com, USA.
Archer Daniels Midland Co., Ultralec G Deoiled Lecithin, Product Code: 700853, May 2008, p. 1, specialtyingredients@admworld.com, USA.
Archer Daniels Midland Co., Ultralec P Deoiled Lecithin, Product Code: 700851, May 2008, p. 1, specialtyingredients@admworld.com, USA.
Archer Daniels Midland Co., Yelkin SS Lecithin, Product Code: 700155, Aug. 2007, p. 1, specialtyingredients@admworld.com, USA.
Parnetti et al, Structuring edible oil with lecithin and sorbitan tristearate, Aug. 2007, Food Hydrocolloids, vol. 21, Iss 5-6, pp. 855-861.
ISA/US, Written Opinion, International Searching Authority, International Application No. PCT/US11/36448, Jul. 21, 2011, pp. 1-6, USA.
ISA/US, Written Opinion, International Searching Authority, International Application No. PCT/US09/64407, Jan. 03, 2010, pp. 1-7, USA.
G. Richardson et al, Microstructure of Crystalline Emulsifiers and their influence on Air Incorporation in Cake Batter, Cereal Chem., 79(4):546-552, (2002).
JC Shah et al, Cubic Phase Gels as Drug Delivery Systems, Advanced Drug Delivery Reviews 47, pp. 229-250, (2001).
D. Van de Walle et al, Influence of the Polarity of the Water Phase on the Mesomorphic Behavior and the A-Gel Stability of a Commercial Distilled Monoglyceride, Food Research International 41, pp. 1020-1025, (2008).
M. Pernetti et al., Structuring of edible oils by alternatives to crystalline fat, Current Opinion in Colloid and Interface Science, vol. 12, Issue 4-5, Oct. 2007, pp. 221-231.
J.F.T. Vazquez et al., Thermal and Textural Properties of Organogels Developed by Candelilla Wax in Safflower Oil, Journal of the American Oil Chemists' Society, Aug. 2007.
M.A. Rogers et al., Crystalline stability of self-assembled fibrillar networks of 12-hydroxystearic acid in edible oils, Food Research International, Food Research International 41, pp. 1026-1034, (2008).
M.A. Rogers, Novel structuring strategies for unsaturated fats—Meeting the zero-trans, zero-saturated fat challenge: A review, Food Research International 42(7), pp. 747-753, (2009).
A.G. Maragoni, Shortening substitutes and novel strategies for nanostructuring liquid oils into functional fats, Coasun Articles, May 16, 2009.
N.E. Hughes et al., Potential food applications of edible oil organogels, Trends in Food Science & Technology, vol. 20, Issue 10, pp. 470-480, Oct. 2009.
N.K.O. Ojijo et al., Changes in Microstructural, thermal, and rheological properties of olive oil/monoglyceride networks during storage, Food Research International 37, pp. 385-393, (2004).
L. Samuditha et al., Physical Properties of Rice Bran Wax in Bulk and Organogels, J Am Oil Chem Soc, 86:1163-1173, (2009).
Extended European Search Report and Written Oppinion, European Patent Office, application No. EP09826843, Mar. 14, 2012, the Hague.
N.E. Hughes et al., Organogels still out of reach for food: Review, Trends in Food Science & Technology, Food Navigator.com, www.foodnavigator.com/content/view/print/254769, Jul. 28, 2009, 2009, p. 1 of 1.
Bot et al., Non-triglyceride structuring of edible oils, Agricultural and Biological Sciences Food Science, Chemistry Physical and Theoretical Chemistry, www.scitopics.com/Non_triglyceride_structuring_of edible_oils, Nov. 19, 2009, pp. 1-5.
P.L. Luisi et al., Organogels from water-in-oil microemulsions, Colloid & Polymer Science, Colloid Polym Sci 268:356-374, (1990).
Vintiloiu et al., Organogels and their use in drug delivery—A Review, Science Direct, Journal of Controlled Release 125 pp. 179-192, (2008).
Hughes et al., Potential food applications of edible oil organogels, Food Science & Technology, Trends in Food Science & Technology 30, pp. 470-480, (2009).

\* cited by examiner

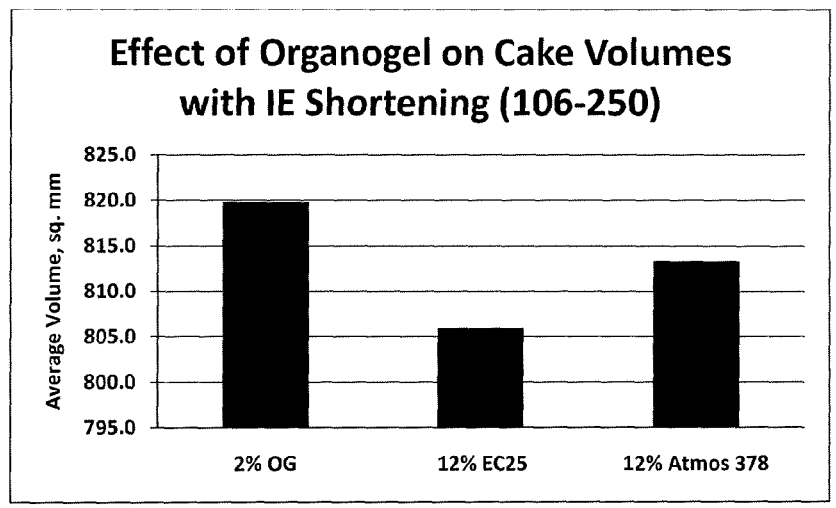
Figure 1: Effect of emulsifier systems on yellow cake volume.
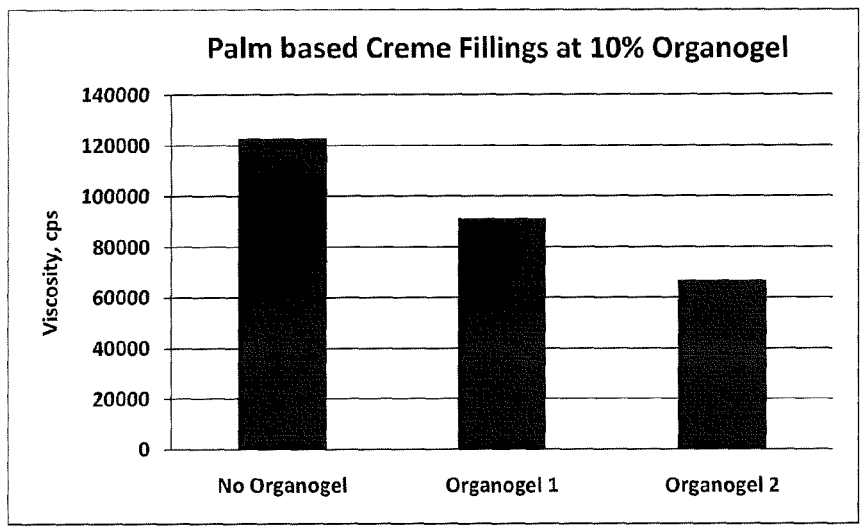
Figure 2: Viscosity of palm based crème fillings.

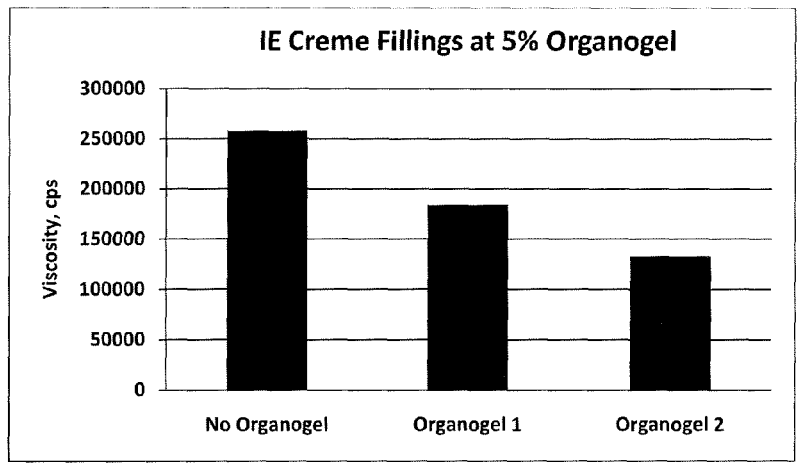
Figure 3: Viscosity of interesterified palm based crème fillings.
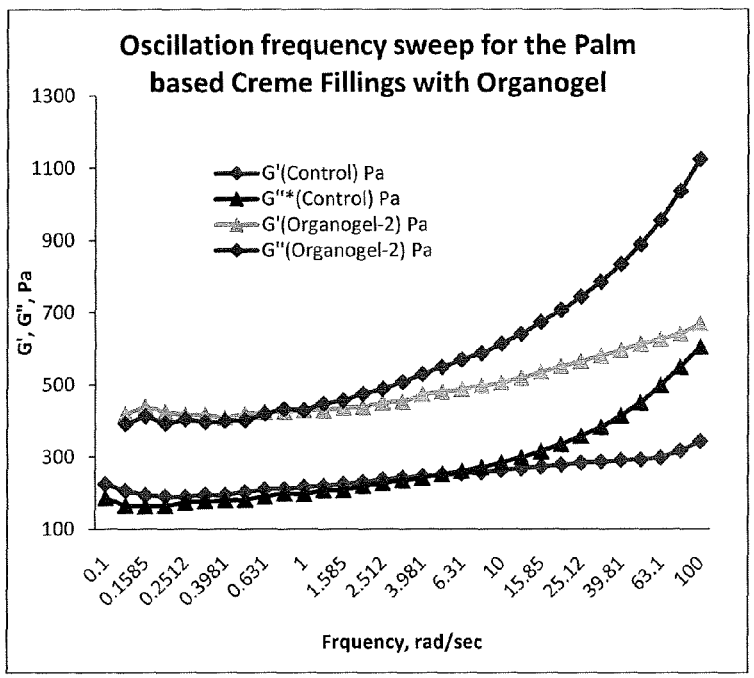
Figure 4: Oscillation sweep measurements for palm based crème fillings including organogels.

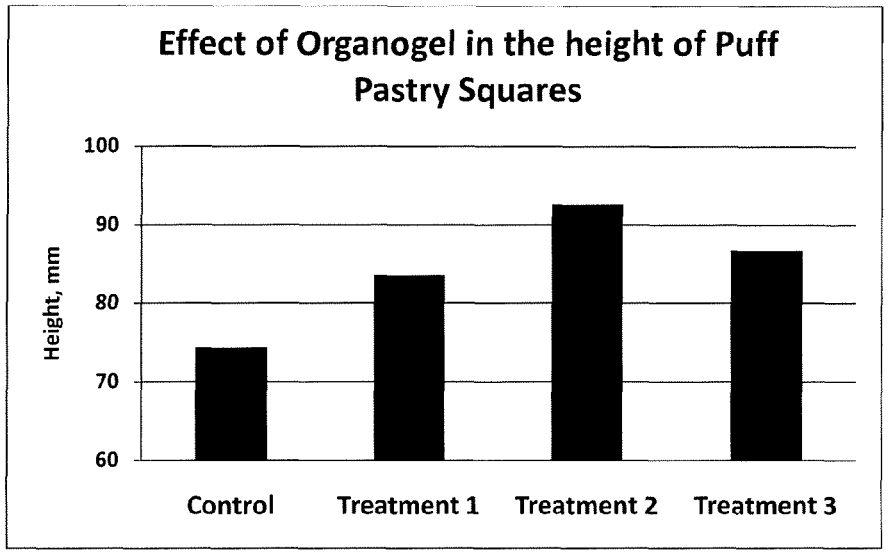
Figure 5: Height (mm) of the puff pastry squares in the presence of organogels.
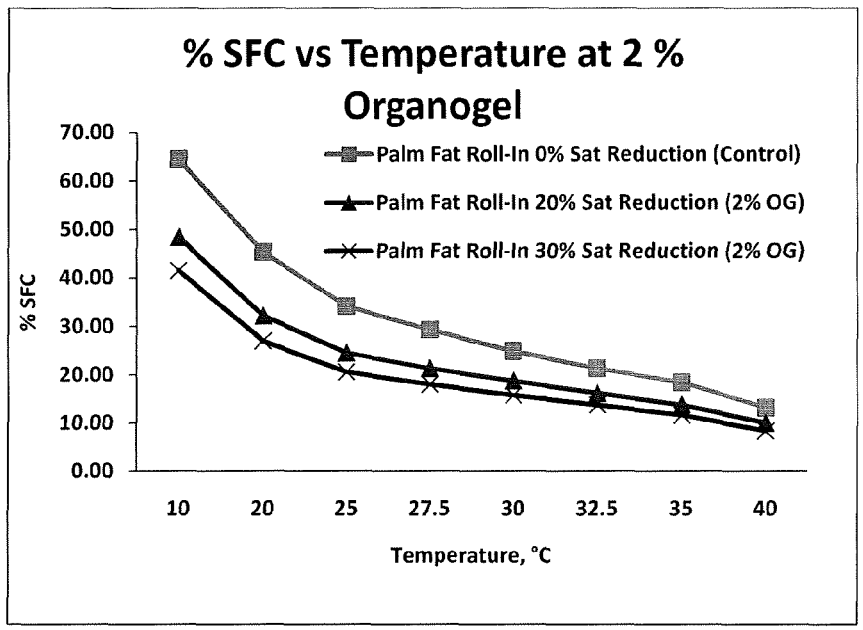
Figure 6: Solid fat content v. Temperature at 2% organogel.

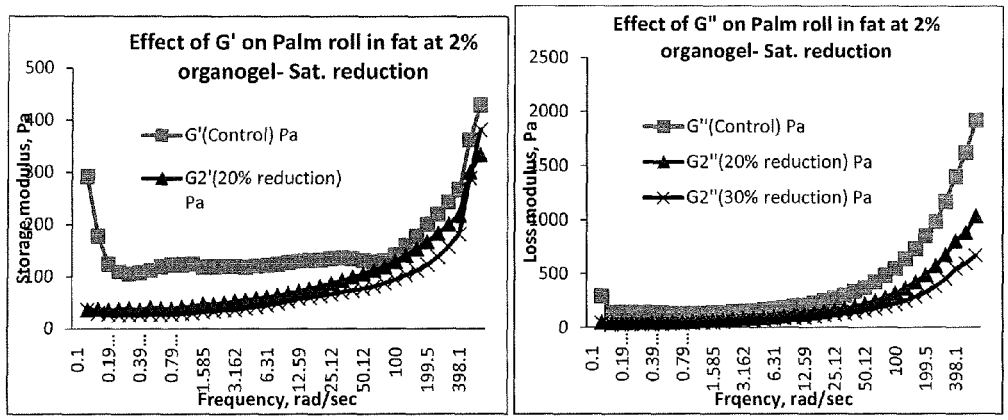
Figure 7: G' and G'' as a function of frequency for palm roll-in fat in the presence of organogel at 20 and 30% saturates reduction.
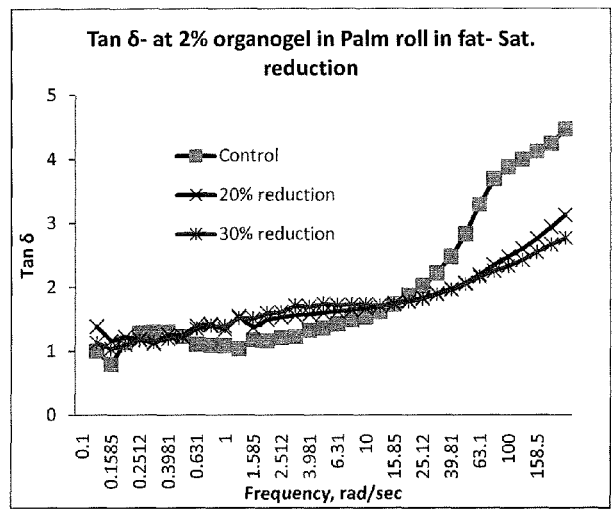
Figure 8: Tan δ as function of frequency at 25°C for 20% and 30% saturate reduction for palm roll-in fat.

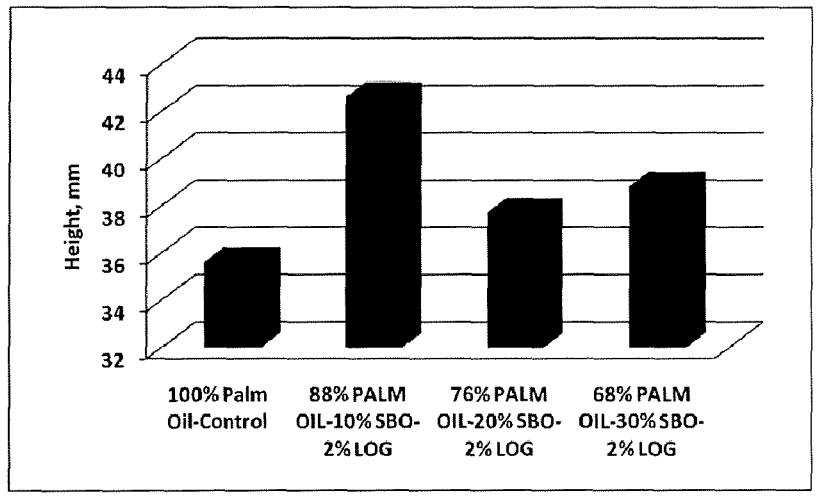
Figure 9: Height of puff pastries produced with organogels.
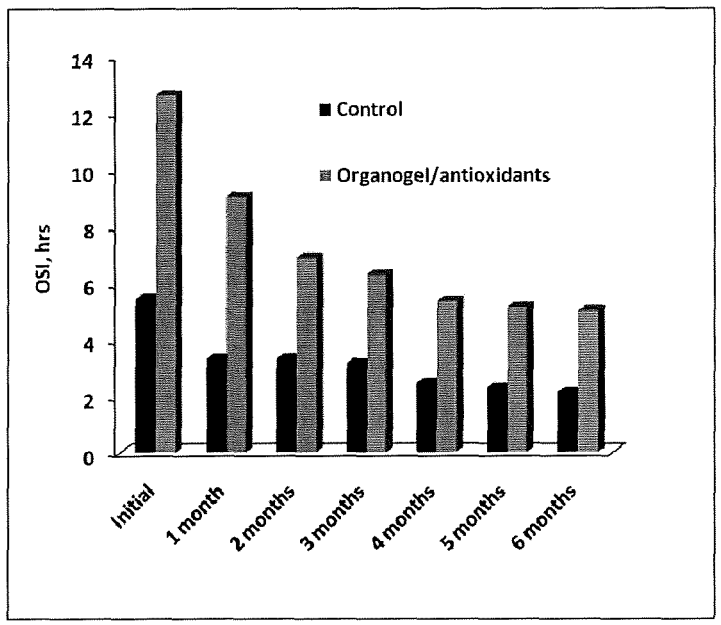
Figure 10: OSI times for Pita Chips treated with antioxidants v. control.

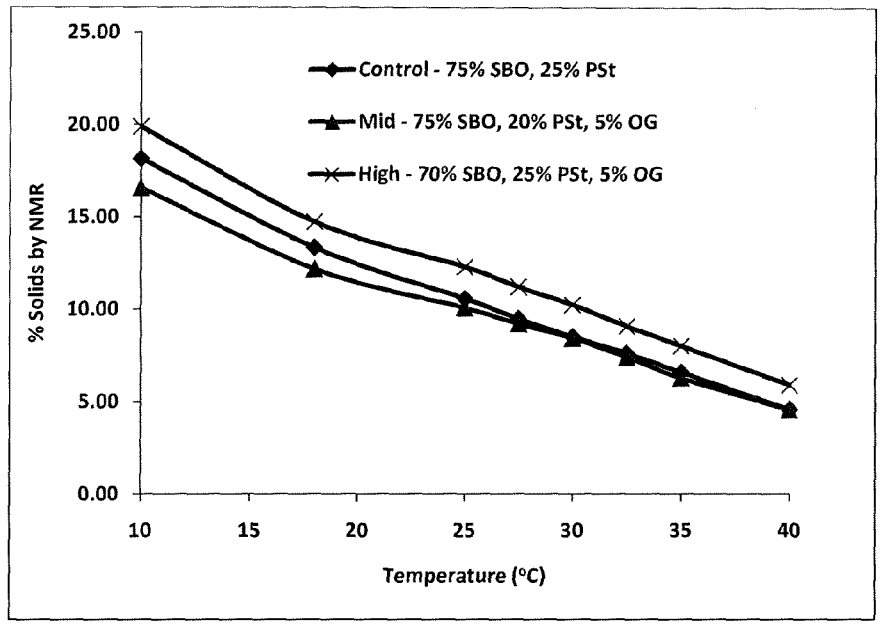
Figure 11: SFC curves for palm stearine blends including organogels.
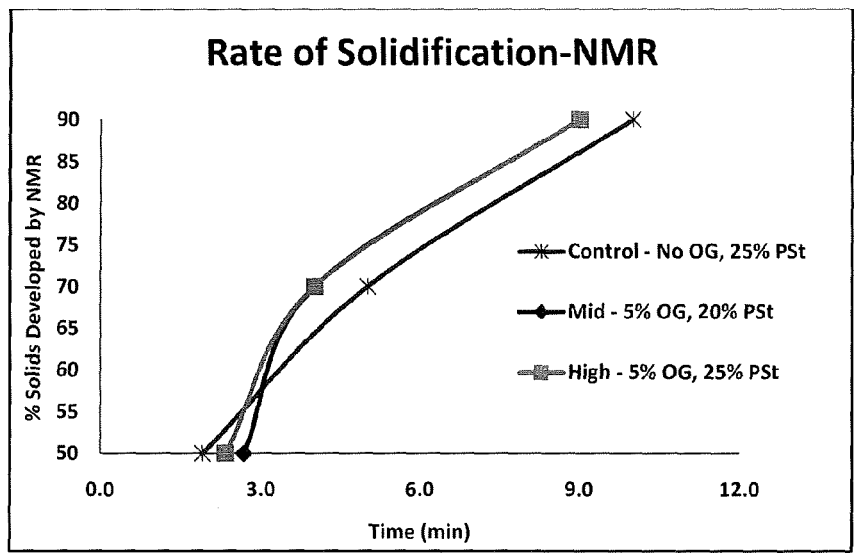
Figure 12: Rate of solidification of palm stearine blends including organogels.

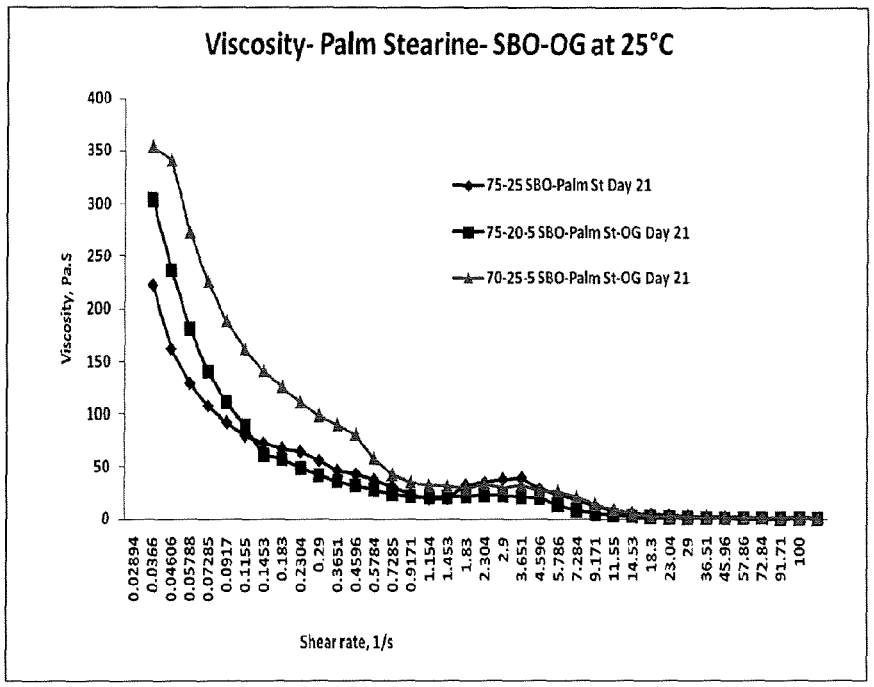
Figure 13: Viscosity curves for the palm stearine blends including the organogel.
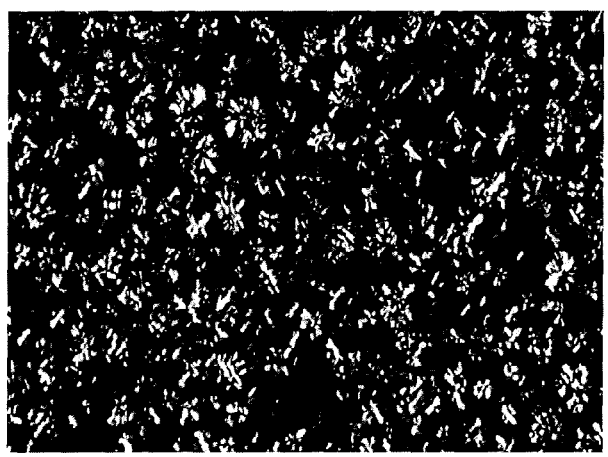
Figure 14: PLM for the Palm Stearine blends using Organogel (70:25:5 SBO:Stearine:Organogel).

FOOD COMPOSITIONS COMPRISING ORGANOGELS

This application is a national stage entry of International Application No. PCT/US 11/36448, filed May 13, 2011, which itself claims priority to U.S. Provisional Patent Application No. 61/334,766, filed May 14, 2010, each of the contents of the entirety of which are incorporated by this reference, and this application also is a continuation-in-part of U.S. patent application Ser. No. 13/128,530, filed May 10, 2011, which is a national stage entry of International Application No. PCT/US09/64407, filed Nov. 13, 2009, which itself claims priority to U.S. Provisional Patent Application No. 61/114,510, filed Nov. 14, 2008.

TECHNICAL FIELD

The present invention relates to organogels. The present disclosure is further directed to compositions comprising an organogel. The present disclosure is also directed to methods for the preparation of and use of the organogel in foods.

BACKGROUND ART

Liquid crystalline structures are well ordered structures that can hold active ingredients, yet restrict the diffusion of the active ingredients to facilitate a controlled release of the active ingredients. However, some of the components used to create these cubic crystalline phases can be difficult to incorporate into such phases. For instance, monoglycerides have some undesirable physical characteristics such as a high melting point that makes the monoglycerides pastes or waxy solids at room temperature. Further, the equilibration time required to form the monoglycerides into such structures may be several hours or days since the diffusion of water through the solid monoglycerides is delayed.

Another problem is that the processes used to form the cubic, liquid crystalline phases are cumbersome since such processes require long holding times, high manufacturing temperatures, and high shear processes that are not economically or commercially viable.

Lecithin organogels are clear, thermodynamically stable, viscoelastic, and biocompatible jelly-like phases typically having hydrated, purified phospholipids, an organic liquid, and a gelating agent. The purified phospholipids that are usually used contain at least 80-95% phosphatidylcholine content to prepare the organogel. A limitation of such organogel formation requires the use of such highly pure lecithin that is expensive and not easily obtained.

Another limitation in the formation of such lecithin organogels is the polymer that is typically used. For instance, the synthetic polymer, pluronic, has been used in lecithin organogels at an amount of between about 30-40%. However, pluronics are non-ionic triblock copolymers which may be characterized as a skin irritant, are not bio-based, not allowed in food systems, and are not inexpensive compounds.

Thus, a need exists for organogels that are easier to manufacture and that use bio-based and/or food-grade components.

DISCLOSURE OF INVENTION

The present invention fulfills these needs and discloses an organogel that is food-grade and commercially viable. The organogels disclosed herein are highly ordered liquid crystalline structures that are unique and generally high-viscosity solid like gels and have the ability to carry compounds meant for consumption.

In one embodiment, an edible thermo-reversible, structured organogel composition for use in a food product comprises an edible emulsifier composition, an edible organic phase, an edible water soluble polymer, and an edible polar phase. Uses of the edible thermo-reversible, structured organogel compositions in a food product, a nutraceutical, a pharmaceutical, a pet food, or an animal feed are also disclosed. The edible emulsifier composition may include a phospholipid composition, a monoglyceride, or a combination thereof.

In another embodiment, an edible thermo-reversible, structured phospholipid organogel composition for use in a food product comprises an edible phospholipid composition, an edible organic phase, an edible water soluble polymer and an edible polar phase. Uses of the edible thermo-reversible, structured phospholipid organogel compositions in a food product, a nutraceutical, a pharmaceutical, a pet food, or an animal feed are also disclosed.

In another embodiment, a method of structuring an edible organic phase comprises mixing an edible thermo-reversible, structured phospholipid organogel composition with the edible organic phase.

In an additional embodiment, a food product or ingredient comprises an edible organic phase and an edible thermo-reversible, structured phospholipid organogel composition.

In a further embodiment, a composition comprises a fat or an oil and an edible thermo-reversible, structured phospholipid organogel composition, wherein the edible thermo-reversible, structured phospholipid organogel composition provides structure to the fat or the oil.

In one embodiment, a method of loading an edible thermo-reversible, structured phospholipid organogel comprises mixing a compound with the edible thermo-reversible, structured phospholipid organogel.

In an additional embodiment, a method of coating a food comprises mixing an oil with an edible thermo-reversible, structured phospholipid organogel, and placing the oil mixed with the edible thermo-reversible, structured phospholipid organogel on a surface of a food.

In further embodiment, an edible thermo-reversible, structured phospholipid organogel composition for use in a food product comprises an edible emulsifier composition, an edible organic phase, an edible water soluble polymer, and an edible polar phase. The edible emulsifier composition may be a phospholipid composition, a monoglyceride, or a combination thereof.

DESCRIPTION OF THE DRAWINGS

FIG. 1 discloses the effect on cake volume of one embodiment of an organogel of the present invention.

FIG. 2 shows the effect on viscosity in a crème filling of one embodiment of an organogel of the present invention.

FIG. 3 illustrates the effect on viscosity in another crème filling of an embodiment of an organogel of the present invention.

FIG. 4 shows oscillation sweep measurements for a crème filling including one embodiment of an organogel of the present invention.

FIG. 5 depicts the height of puff pastry produced with one embodiment of an organogel of the present invention.

FIG. 6 discloses the solid fat content versus temperature of a fat roll-in including an embodiment of an organogel of the present invention.

FIG. 7 illustrates oscillation sweep measurements for a roll-in fat including one embodiment of an organogel of the present invention.

FIG. 8 shows the Tan δ as a function of frequency in relation to the ability of an embodiment of an organogel of the present invention to reduce the amount of saturates in a roll-in fat.

FIG. 9 shows the height of puff pastries produced with an embodiment of an organogel of the present invention.

FIG. 10 shows the Oxidation Stability Index for a food product produced with an embodiment of an organogel of the present invention.

FIG. 11 shows Solid Fat Content curves for fat blends including an embodiment of an organogel of the present invention.

FIG. 12 illustrates rates of solidification for fat blends including an embodiment of an organogel of the present invention.

FIG. 13 depicts viscosity curves for fat blends including an embodiment of an organogel of the present invention.

FIG. 14 shows a polarized light microscopy picture for a fat blend including an embodiment of an organogel of the present invention.

MODES FOR CARRYING OUT THE INVENTION

In one embodiment, the present invention is directed towards processes for producing organogels, as well as the organogels produced therefrom.

In another embodiment, the present invention includes a composition comprising an edible emulsifier composition, an edible organic phase, an edible water soluble polymer, and an edible polar phase. The edible emulsifier composition may include a phospholipid composition, a monoglyceride, and a combination thereof.

In yet a further embodiment, the composition takes the form of a clear, thermodynamically stable, viscoelastic jelly-like phase. This may be accomplished by placing the edible phospholipid composition, the edible organic phase, the edible water soluble polymer and the edible polar phase in such amounts in the composition and processing the composition in such a manner to produce such a clear, thermodynamically stable, viscoelastic jelly-like phase.

In a further embodiment, the composition may be configured as a food ingredient for use in a food stuff, beverage, nutraceutical, pharmaceutical, pet food or animal feed. In one embodiment, the composition may further comprise a compound selected from the group consisting of green tea extract, a flavoring agent, ascorbic acid, potassium sorbate, citric acid, natural polar antioxidants, tocopherols, sterols or phytosterols, saw palmetto, caffeine, sea weed extract, grapeseed extract, rosemary extract, almond oil, lavender oil, peppermint oil, bromelain, capsaicin, emulsifiers or combinations of any thereof. In other embodiments, the organogels of the present invention may be used to solubilize polar, non-polar and/or amphilic guest molecules. In another embodiment, the organogels of the present invention may be used to solubilize or carry enzymes.

In another embodiment, the composition may be used in a food product. In such embodiments, non-limiting uses of the composition include, without limitation: a structuring agent for providing or enhancing structure in foods such as, for example, in spreads, mayonnaise, dressing, sauce, shortenings, fluid oils, fillings, icings, frostings, a creamer, compound coatings, chocolate, confectionary chips, confectionary chunks, an emulsifier that can be used to carry active ingredients or enzymes such as in baking applications, a film forming composition that can hold active ingredients, a coating for carrying spices, seasonings or flavorings on a food, a film-forming composition that could be used as a release agent, a beverage emulsion or as a carrier for delivering nutritional, or bio-active compounds.

In one embodiment, the lecithin organogels of the present invention may be used in the cocoa industry to produce chocolate, cocoa containing foods, chocolate drops, compound drops, wafers, compound coatings, chocolate coatings, coating products, chips, chunks, white chocolate, or other confectionary products. In another embodiment, the lecithin organogels may be used in conjunction with cocoa powder, cocoa butter, cocoa liquor, a vanilla flavoring other flavorings, a sweetener, a vegetable fat, or combinations of any thereof in the production a confectionary product.

In one embodiment, the organogels of the present invention may be used to: improve the stability of an active ingredient; function as an emulsion stabilizer; lower the saturated fat content of a food and/or produce a food having a low saturated fat content; carry polar antioxidants; improve the pliability of a fat in puff pastry; improve the spreadability of a high protein product such as a crème filling; decrease the usage level of an emulsion; replace trans fat in a food product; produce a lower fat product or other uses.

In one embodiment, the phospholipid composition comprises lecithin produced by various processes. Lecithins suitable for use in the disclosed compositions and methods include, but are not limited to, crude filtered lecithin, standardized-fluid lecithins, de-oiled lecithin, chemically and/or enzymatically modified lecithins, alcohol fractionated lecithins, chromatagraphicly purified lecithins, purified lecithins, and blends of any thereof. A crude filtered lecithin having an HLB value of approximately 4.0 may be used. Standardized lecithin including additives having HLB values ranging from 10.0 to 24.0, which results in lecithin compositions having HLB values of 7.0 to 10.0 may be used. Any lecithin or combinations of lecithins are suitable for use in the disclosed compositions and methods regardless of the initial HLB value of the lecithin.

In another embodiment, the phospholipid composition comprises any purity. In various embodiments, the phospholipid composition has less than 90% phosphatides, has less than 30% phosphatidyl choline, has between 10-95% phosphatidyl choline content, or combinations of any thereof. The use of a lecithin having less than 90% phosphatides or less than 30% phosphatidyl choline is beneficial since such a composition is more economical to produce than using a lecithin composition having greater than 90% phosphatides or greater than 30% phosphatidyl choline.

In one embodiment, the lecithin comprises ULTRALEC P brand deoiled lecithin available from Archer-Daniels-Midland Company, Decatur, Ill. Deoiled lecithin is typically in dry form of a powder, fine granule or a granule, and comprises a minimum of 97.0% acetone insolubles as determined by AOCS Ja 4-46, a maximum of 1.0% moisture as determined by AOCS Ja 2b-87, a maximum of 0.05% of hexane insolubles as determined by AOCS Ja 3-87, and an effective HLB value of approximately 7.

In another embodiment, the lecithin comprises YEKLIN SS brand lecithin available from Archer-Daniels-Midland Company, Decatur, Ill. This lecithin is a light amber liquid and comprises a minimum of 62.00% acetone insolubles as determined by AOCS Ja 4-46, has a maximum acid value of 30.00 mg KOH/g as determined by AOCS Ja 6-55, a maximum of 1.0% moisture as determined by AOCS Ja 2b-87, a maximum color (Gardner, as is) of 14.00 as determined by AOCS Ja 9-87, a maximum of 0.05% hexane insolubles as determined by AOCS Ja 3-87, a maximum viscosity of 100 stokes at 77 degrees as determined by AOCS Ja-87 and an effective HLB value of approximately 4.

In a further embodiment, the lecithin comprises THERMOLEC WFC brand hydroxylated soy lecithin available from Archer-Daniels-Midland Company, Decatur, Ill. This lecithin is a translucent liquid and comprises a minimum of 60.00% acetone insolubles as determined by AOCS Ja 4-46, has a maximum acid value of 30.00 mg KOH/g as determined by AOCS Ja 6-55, a maximum of 1.0% moisture as determined by AOCS Ja 2b-87, a maximum color (Gardner, as is) of 13.00 as determined by AOCS Ja 9-87, a maximum of 0.05% hexane insolubles as determined by AOCS Ja 3-87, a maximum peroxide value of 10.0 as determined by AOCS Ja 8-87, and a maximum viscosity of 100 stokes at 77 degrees as determined by AOCS Ja 11-87.

In an additional embodiment, the lecithin comprises THERMOLEC 200 brand soy acetylated lecithin available from Archer-Daniels-Midland Company, Decatur, Ill. This lecithin is a translucent liquid and comprises a minimum of 62.00% acetone insolubles as determined by AOCS Ja 4-46, has a maximum acid value of 30.00 mg KOH/g as determined by AOCS Ja 6-55, a maximum of 0.8% moisture as determined by AOCS Ja 2b-87, a maximum color (Gardner, as is) of 14.00 as determined by AOCS Ja 9-87, a maximum of 0.05% hexane insolubles as determined by AOCS Ja 3-87, a maximum peroxide value of 5.0 as determined by AOCS Ja 8-87, a maximum viscosity of 75 stokes at 77 degrees as determined by AOCS Ja 11-87, and an effective HLB value of approximately 7.

In a further embodiment, the water soluble polymer comprises xanthan gum, gellan gum, cellulose and modified cellulose products, starch, chitin, carrageenan, gum arabic, an alginate, gum acacia, guar gum, agar, gelatin, locust bean gum, inulin, maltodextrin, pectin, beta glucans, or combinations of any thereof. In an additional embodiment, the water soluble polymer may be present in a concentration of between 0.5-1.0%. In other embodiments, water soluble polymers that are synthetic or natural could be used.

In one embodiment, the organic phase comprises vegetable oil such as triglyceride and/or diglyceride oils, a food-grade low hydrophilic lipophilic balance (HLB) emulsifier, polyol esters, monoglycerides, diglycerides, fatty acid esters, or combinations of any thereof. The vegetable oil may be soybean oil, canola oil, rapeseed oil, sunflower oil, corn oil, cottonseed oil, linseed oil, safflower oil, palm oil, cocoa butter, coconut oil, peanut oil, a fraction of any thereof, an interesterified product of any thereof, or combinations of any thereof.

In one embodiment, the polar phase comprises water, glycerol, propylene glycol, isosorbide, isosorbide derivatives, sorbitol, erythritol, carbohydrates, high HLB emulsifiers, other polyhydric alcohols, or combinations of any thereof.

In one embodiment, the compositions described herein are bio-based. Bio-based content of a product may be verified by ASTM International Radioisotope Standard Method D 6866. ASTM International Radioisotope Standard Method D 6866 determines bio-based content of a material based on the amount of bio-based carbon in the material or product as a percent of the weight (mass) of the total organic carbon in the material or product. Bio-derived and bio-based products will have a carbon isotope ratio characteristic of a biologically derived composition.

In an additional embodiment, each of the components of the compositions of the present invention is edible and/or approved for use in foods. In a further embodiment, a preservative may added to the organogels for use in foods. Examples of preservatives include, but are not limited to, potassium sorbate, citric acid, sodium benzoate or other good grade preservatives.

The invention is further explained by use of the following exemplary embodiments.

Example 1

The lecithin organogel produced in this example will be referred to as Organogel 1. An organic phase was prepared by adding YELKINS SS brand lecithin, available from Archer-Daniels-Midland Company, Decatur, Ill., at 70% concentration by weight to 10% PGE 3-4-0 brand polyglyceryl ester, (Polyaldo 3-4-0, available from Lonza, N.J.), 10% high oleic sunflower oil (TRISUN Oil, available from Stratas Foods, Memphis, Tenn.) and 5 grams of monoglyceride (Dimodan SO/D K-A, available from Danisco, Olathe, Kans.). The lecithin was dissolved in the mixture of polyglyceryl ester, high oleic sunflower oil and the monoglyceride with constant stirring at room temperature.

A polar phase was prepared by dispersing NOVAXAN D brand xanthan gum, a water dispersible transparent xanthan gum, available from Archer-Daniels-Midland Company of Decatur, Ill., at 0.75% (w/v) along with ULTRALEC P brand lecithin, a water dispersible, powdered lecithin at 1% (w/v) available from Archer-Daniels-Midland Company, Decatur, Ill., and 0.5% of the preservative, potassium sorbate, in distilled water at room temperature.

The polar phase was slowly introduced into the organic phase under constant stirring at concentrations of 10% at room temperature. At this point, the lecithin organic phase spontaneously changed from a Newtonian fluid to a viscous gel phase, also referred to as the lecithin organogel. Upon heating, the lecithin organogel became fluid and self assembled back into the lecithin organogel upon cooling, indicating a thermoreversible property of the lecithin organogel.

Example 2

The lecithin organogel produced in this example will be referred to as Organogel 2. An organic phase was prepared by adding YELKIN SS brand lecithin, available from Archer-Daniels-Midland Company of Decatur, Ill. at 75% concentration by weight to 10.0% PGE 3-4-0 brand polyglyceryl ester and 10.0% high oleic sunflower oil (TRISUN brand oil, available from Stratas Foods, Memphis, Tenn.) and dissolving the lecithin in the mixture of polyglyceryl ester and the high oleic sunflower oil with constant stirring at room temperature.

A polar phase was prepared by dispersing NOVAXAN brand xanthan gum, a water dispersible transparent xanthan gum available from Archer-Daniels-Midland Company, Decatur, Ill. at 0.75% (w/v) along with ULTRALEC P brand lecithin, a water dispersible powdered lecithin at 1% (w/v) and 0.5% of a preservative, potassium sorbate, as a preservative in distilled water at room temperature.

The polar phase was slowly introduced into the organic phase under constant stirring at concentrations of 5% at room temperature. At this point, the lecithin organic phase spontaneously changed from a Newtonian fluid to a viscous gel phase, also referred to as the lecithin organogel. Upon heating, the lecithin organogel became fluid and self assembled back into the lecithin organogel upon cooling, indicating the thermoreversible property of the lecithin organogel.

Example 3

The effect of lecithin organogels on cake volumes was compared to known emulsifiers systems. The known emulsifier systems used in this Example were used at the recommended usage levels. The yellow cake formulation is disclosed in Table 1.

TABLE 1

Yellow cake formulation treatments with an interesterified shortening.
All amounts are shown in percentages.

| Ingredients | Control | Treatment 1 | Treatment 2 | Treatment 3 |
|---|---|---|---|---|
| Cake flour, TEA TABLE CAKE brand flour, available from ADM Milling Company, Overland Park, KS | 22.56 | 22.56 | 22.56 | 22.56 |
| High ratio shortening (106-250) | 10.15 | 9.95 | 8.93 | 8.96 |
| Organogel 1 | — | 0.2 | — | — |
| EC-25 brand propylene glycol esters emulsifier, available from Loders Croklaan, Channahon, IL | — | — | 1.22 | — |
| ATMOS 378K brand hydrated emulsifier blend, available from Caravan Ingredients, Lenexa, KS | — | — | — | 1.22 |
| Granulated sugar | 27.07 | 27.07 | 27.07 | 27.07 |
| Salt | 0.85 | 0.85 | 0.85 | 0.85 |
| Baking powder | 1.47 | 1.47 | 1.47 | 1.47 |
| Non fat dry milk | 2.60 | 2.60 | 2.60 | 2.60 |
| Water (1$^{st}$ stage) | 12.34 | 12.34 | 12.34 | 12.34 |
| Whole eggs | 16.92 | 16.92 | 16.92 | 16.92 |
| Flavor | 0.11 | 0.11 | 0.11 | 0.11 |
| Water (2$^{nd}$ stage) | 5.92 | 5.92 | 5.92 | 5.92 |
| Total | 100 | 100 | 100 | 100 |

The three emulsifier systems evaluated in this Example were: Organogel 1 as described in Example 1; EC-25 brand propylene glycol esters emulsifier which includes PGME, mono/di glycerides, lecithin, BHT and citric acid; and ATMOS 378K brand hydrated emulsifier blend which includes hydrated mono/di glycerides, polysorbate 60, SSL, phosphoric acid, sodium proprionate and sodium benzoate.

The evaluation in this Example was carried out with the following procedure: the shortening and emulsifier system were combined in a small Hobart mixer on speed 1 for 1 minute following by the addition of the flour; the flour was mixed with the shortening and emulsifier for 1 minute on speed 1, followed by mixing for 5 minutes on speed 2; the other dry ingredients including the sugar, salt baking powder and non fat dry milk were added and mixed for 1 minute on speed 1; the eggs and flavor were added in 2 parts, scraping down between each part; after all the eggs were added, the mixture was mixed for 2 minutes on speed 2 and scraped down; the 1$^{st}$ stage water for slowly added over 1 minute and mixed for 2 minutes and speed 2 and scraped down; the 2$^{nd}$ stage water was added in two parts, mixing and scraping down after each of the parts; the mixture was mixed for 2 minutes on speed 1 and scraped down; the cup weights of the batter were recorded; 400+/−3 grams of the batter was placed into prepared 8 inch cake pans; the cakes were baked at 370° F. for 20-22 minutes; the cakes were depanned about 30 minutes after the cakes were removed from the oven; the cakes were allowed to cool for about 1 hour, and volume readings and baggings were done.

FIG. 1 shows the average volume of the cakes prepared in Example 1 in square millimeters. FIG. 1 shows that the lecithin organogel provided for a better volume than the known emulsifier systems that were used at about 6 times the level of the lecithin organogel.

The texture properties of the three evaluated emulsifier systems in the cakes were very comparable with the cakes including the 6% EC-25 brand propylene glycol esters emulsifier showing a slight improvement as shown in Table 2. This could possibly be attributed to very high levels of emulsifiers and the types of emulsifiers in the various emulsifier systems tested. The good cake volume and texture properties result from different factors such as the synergistic emulsifier blend corresponding to the type of shortening used. Further, the enhanced functionality of the emulsifier in a certain liquid crystalline phase changed the fat crystallization properties or the interaction of the emulsifier with starch, sugar or water in the system which may cause more or less a synergism in the formulation. The seemed to be the case with the lecithin organogel system where a very low level of use resulted in comparable functionality/performance to the other types of emulsifier systems where the lecithin organogel resulted in good aeration and texture in the cakes.

TABLE 2

Texture profile analysis (TPA) for the evaluated cakes.

| Treatment | Hardness | | Springiness | | Cohesiveness | | Chewiness | |
|---|---|---|---|---|---|---|---|---|
| | Day 1 | Day 7 | Day 1 | Day 7 | Day 1 | Day 7 | Day 1 | Day 7 |
| 2% Organogel | 1066.94 | 1316.57 | 0.934 | 0.937 | 0.533 | 0.452 | 530.06 | 557.94 |
| 6% EC-25 brand propylene glycol esters emulsifier | 971.52 | 1134.73 | 0.894 | 0.913 | 0.508 | 0.450 | 441.69 | 466.46 |
| 6% ATMOS 378K brand hydrated emulsifier blend | 981.48 | 1228.87 | 0.937 | 0.925 | 0.502 | 0.456 | 460.97 | 518.50 |

Example 4

The evaluation of lecithin organogels in crème fillings. In a mixing bowl, the lecithin organogel 1 of Example 1 and the lecithin organogel 2 of Example 2 were dispersed in palm shortening at 120° F. to 130° F. All of the ingredients of Table 3 were added to the bowl and blended on a Hobart mixer for 2.5-3.0 minutes with a paddle blade on low to medium speed. The viscosity of the resulting crème fillings was measured at 115° F.

TABLE 3

Palm based crème fillings at 10% lecithin organogel replacement.

| INGREDIENTS | No Organogel | Organogel 1 | Organogel 2 |
|---|---|---|---|
| ADM Palm Shortening (101-640) | 24.10 | 22.52 | 22.52 |
| ADM Soy Oil | 12.97 | 12.97 | 12.97 |
| ADM YELKIN TS brand lecithin | 0.92 | 0.00 | 0.00 |
| Lecithin Organogel | 0.00 | 2.5 | 2.5 |
| Nonfat Dry Milk Extra Grade | 9.32 | 9.32 | 9.32 |
| Ottens French Vanilla flavor | 0.63 | 0.63 | 0.63 |

TABLE 3-continued

Palm based crème fillings at 10% lecithin organogel replacement.

| INGREDIENTS | No Organogel | Organogel 1 | Organogel 2 |
|---|---|---|---|
| 88% Lactic Acid | 0.50 | 0.50 | 0.50 |
| Sucralose | 0.06 | 0.06 | 0.06 |
| Salt | 0.50 | 0.50 | 0.50 |
| FIBERSOL-2 brand resistant maltodextrin, available from Archer-Daniels-Midland Company, Decatur, IL | 21.00 | 21.00 | 21.00 |
| ADM PROFAM brand soy protein isolate, available from Archer-Daniels-Midland Company, Decatur, IL | 30.00 | 30.00 | 30.00 |
| Total % | 100 | 100 | 100 |

FIG. 2 shows the viscosity of the palm based crème fillings prepared in accordance with Table 3. The viscosity was significantly lowered for the palm based crème fillings that included the lecithin organogels which enables greater uniform spreading of the crème filling on a sandwich cookie or other substrate.

In a mixing bowl, the lecithin organogel 1 of Example 1 and the lecithin organogel 2 of Example 2 were dispersed in an interesterified palm shortening at 120° F. to 130° F. The ingredients of Table 3 were added to the bowl and blended on a Hobart mixer for 2.5-3.0 minutes with a paddle blade on low to medium speed. The viscosity of the resulting crème fillings were measured at 115° F.

TABLE 4

Interesterified palm based crème fillings at 10% lecithin organogel replacement.

| INGREDIENTS | No Organogel | Organogel 1 | Organogel 2 |
|---|---|---|---|
| ADM IE Shortening(106-150) | 24.10 | 23.77 | 23.77 |
| soy oil | 12.97 | 12.97 | 12.97 |
| YELKIN TS brand lecithin, available from Archer-Daniels-Midland Company, Decatur, IL | 0.92 | 0.00 | 0.00 |
| lecithin organogel (5%) | 0.00 | 1.25 | 1.25 |
| Nonfat Dry Milk Extra Grade | 9.32 | 9.32 | 9.32 |
| Ottens French Vanilla flavor | 0.63 | 0.63 | 0.63 |
| 88% lactic acid | 0.50 | 0.50 | 0.50 |
| sucralose | 0.06 | 0.06 | 0.06 |
| salt | 0.50 | 0.50 | 0.50 |
| FIBERSOL-2 brand resistant maltodextrin, available from Archer-Daniels-Midland Company, Decatur, IL | 21.00 | 21.00 | 21.00 |
| ADM PROFAM brand soy protein isolate, available from Archer-Daniels-Midland Company, Decatur, IL | 30.00 | 30.00 | 30.00 |
| Total % | 100 | 100 | 100 |

FIG. 3 shows the viscosity of the interesterified palm based crème fillings prepared in accordance with Table 4. The viscosity was significantly lowered for the interesterified palm based crème fillings that included the lecithin organogels which enables greater uniform spreading of the crème filling on a sandwich cookie or other substrate.

Oscillation frequency sweep measurements were performed to quantify the uniform spreadability of the crème fillings including the lecithin organogels and the results are shown in FIG. 4. FIG. 4 shows that the G' was always greater than the G" at lower frequency and with an increase in frequency, G' was decreased while G" was increased and G" was much greater than the G'. The loss tangent (Tan δ) is a dimensionless parameter which is the ratio of G' to G". Tan δ≤1 has predominant elastic behavior and the system with Tan δ>1 has a prevailing viscous behavior. In the crème fillings based on palm (i.e., the control), the transformation from elastic to viscous takes place at much higher frequency unlike the systems containing the lecithin organogel. This shows the greater spreadability of the fillings including the lecithin organogel.

Example 5

The evaluation of lecithin organogels for coatings. In this example, the ability of the lecithin organogel to improve the adherence of spices and flavors using a spray oil including the lecithin organogel on a snack product is disclosed. The greasiness of the oil was reduced and film forming properties were increased in the process which results in preventing the spices and/or seasonings from sticking to a person's fingers when consuming the snack product. In known processes, a starch based protective layer is often applied in order to help avoid seasonings and/or spices from sticking to a person's fingers which increases the number of processing steps as well as the cost of production.

This example illustrates the ability of an oil including the lecithin organogel to maintain a good adhesion of the spices and/or seasonings on a snack product and leave less residual spices and/or seasonings in the bag that the snack product is placed and reduces the amount of spices and/or seasonings that adheres to a person's fingers during consumption. An oil including the lecithin organogel also can hold polar (e.g., ascorbic acid, citric acid or green tea extracts) and non-polar antioxidants (e.g., tocopherols). This advantage helps enhance the flavor stability of the coated snack by retarding the formation of off flavors due to oil rancidity.

Two heated oils (120°-140° F.) including organogel 1 and organogel 2, respectively, were slowly sprayed on a healthy, extruded bean chip, and a barbecue seasoning/spices mixture was evenly distributed over the oil/organogel coated chip. The process was done using a rotating tumbler with baffles. The tumbler was left rotating for 1 minute between oil and seasoning applications in order to ensure uniform coating in the control and treatments. The treatment included the addition of 5% of the lecithin organogel 1 or organogel 2.

The coated snacks were weighed, placed into a brown paper bag and shaken for a specified period of time. The coated snacks were transferred from the bag onto a plate and the bag was weighed. Table 5 shows the results of the weighing of the bag. The lower the differences in the weights, the better the adhesion of the spices and/or seasonings to the chip.

TABLE 5

| Samples | Weight, grams Before cleaning | Weight, grams After cleaning | Difference |
|---|---|---|---|
| Control | 17.37 | 16.52 | 0.85 |
| Organogel 1 | 16.38 | 15.90 | 0.48 |
| Organogel 2 | 17.69 | 17.37 | 0.32 |

The oil/lecithin organogel coated snacks had 40% less residue after shaking than the control coated snacks that were coated with oil alone.

Example 6

Evaluating lecithin organogels in puff pastry.

Roll-in shortenings were prepared as disclosed in Table 6. For treatments 1-3, 20% of the roll-in was melted and combined with a lecithin organogel to ensure uniform mixing. The 20% roll-in shortening including the lecithin organogel was combined with the remaining 80% of the roll-in shortening and mixed in an N 50 Hobart mixer for 5 minutes to ensure the homogenous distribution of the lecithin organogel throughout the entire portion of the roll-in shortening to occur. The fat blends were rolled out and allowed to sit at room temperature overnight to ensure full crystallization and equilibration of the fat blends prior to the manufacturing the puff pastries.

The puff pastries were manufactured as follows. The flour was combined with the salt; cold water was added in a McDuffy mixer with a water jacket cooler at 4° C., the dough was mixed for 3 minutes at the $1^{st}$ speed and 4 minutes at the $2^{nd}$ speed; and the dough was shaped into a rectangular shape with a seam on the bottom, placed on a flour dusted table and allowed to rest for 20 minutes. The roll-in shortening was shaped to a rectangular shape about 5-7 mm thick and sheeted to equal thickness of a roll-in shortening. The shortening should cover about ⅔ of the sheeted dough. The edges of the dough were closed up around the roll-in shortening and covered about ½ of the roll-in shortening with the remaining dough not being covered by the roll-in shortening. The remaining ½ of the dough with the exposed roll-in shortening was folded over on top of the dough to close up. The dough was turned and sheeted to reduce; 30-27-24-21-18-15-12-10-9. A single threefold-fold was performed by folding ⅓ in the remaining ½ over the top. The dough/roll-in shortening was allowed to rest for 20 minutes at 50° F. covered with a plastic. The rested dough/roll-in shortening was sheeted to reduce to: 30-27-24-21-18-15-12-109-8-7-6. A double book fold was performed by folding ¼ in, the remaining ¾ fold in toward ¼ to butt-join, and folded in half. The folded dough/roll-in shortening was allowed to rest 20 minutes at 50° F. covered in plastic. The dough was turned and sheeted to reduce to: 30-27-24-21-18-15-12-10-9. A singled three fold was performed by folding ⅓ in the remaining over ½ top. The dough was allowed to rest for 20 minutes at 50° F. covered with plastic. The dough was sheeted to reduce to: 30-27-24-21-18-15-12-10-9-8-7-6. A double book fold was performed by folding ¼ in, with the remaining ¾ folded in toward ¼ to butt-join, and folded in half. The dough was allowed to rest for 60 minutes at 50° F. covered with plastic.

TABLE 6

Puff pastry treatments in the presence of lecithin organogels.

| INGREDIENT | Control | Treatments 1 | 2 | 3 |
|---|---|---|---|---|
| GOLDEN HAWK brand flour available from ADM Milling Co., Overland Park, KS | 38.3142% | 38.3142% | 38.3142% | 38.3142% |
| All Purpose Shortening—ADM 101-050 | 3.8314% | 3.8314% | 3.8314% | 3.8314% |
| salt | 0.3831% | 0.3831% | 0.3831% | 0.3831% |
| cold (35-40° F.) Water | 22.9885% | 22.9885% | 22.9885% | 22.9885% |
| Roll-In Pastry Shortening (Drewpuff) | 34.4828% | 34.13% | 33.79% | 34.13% |
| organogel 1 | — | 0.344% | 0.69% | — |
| organogel 2 | — | — | — | 0.344% |

FIG. 5 shows the height of the puff pastry squares and illustrates that puff pastries including the lecithin organogels enhances the lamination performance of the shortening including the lecithin organogels and increases the resulting height of the puff pastry.

Example 7

The solid fat content and rheology were used to determine the effect of fat structuring/replacement of palm roll fat at different levels of oil. The oil was substituted at 10, 20, and 30% of the palm roll-in shortening to achieve 10, 20 and 30% saturate reduction, respectively. Each study in this Example was done with 2% lecithin organogel in the oil.

The solid fat content (SFC) was determined using a Bruker Minispec mp 20 pulse nuclear NMR instrument. Samples were melted (2.7+/−0.1 g) in SFC tubes (8 for each treatment. Samples were heated in a microwave for 1-2 minutes, until the samples reached about 70° C. All samples were placed in a 60° C. block for 20 minutes followed by tempering in a 0° C. block for 1 hour. The samples were put into individual blocks at 10° C., 20° C., 25° C., 27.5° C., 30° C., 32.5° C., 35° C. and 40° C. (8 samples/treatment, done in series) for 30-35 minutes. The data was recorded and results were compared against the palm roll-in fat control without the lecithin organogel.

FIG. 6 shows the solid fat content versus temperature for the control and 2% lecithin organogel.

Rheological measurements of the palm roll-in fat and the replacement of such with vegetable oil were carried out with Instrument AR2000ex. A cone and plate geometry with 40 mm diameter and cone of 2 degree was used. Oscillation sweep at 25° C. with 0.1 to 500 angular frequencies (rad/s) at 12% strain. The values for storage modulus (G'), loss modulus (G") and Tan Delta were obtained. All samples were analyzed in duplicate.

FIG. 7 shows G' and G" as a function of frequency for palm roll-in fat in the presence of lecithin organogel at 20% and 30% saturate reduction. FIG. 7 shows that the G' and G" for all of the samples increased with increasing frequency. The frequency dependency of the palm roll-in fat and their blends indicate some kind of viscoelastic solid like behavior. Further, the G" was always higher than the G' in all samples studies showing a predominant viscous character as opposed to an elastic solid. However, the smaller the difference in the G' and the G" indicates that the system is more structured.

FIG. 8 illustrates the tan δ as a function of frequency at 25° C. for 20% and 30% saturate reduction for palm roll-in fat.

In the oscillation frequency sweep, G' is the measure of energy stored and recovered per cycle of deformation and reflects the elastic component of the viscoelastic material. G" is the measure of energy lost per cycle and reflects the viscous component. In both the 20% and 30% fat reduction, the storage and loss modulus were lower than the control at lower frequencies resulting in more soft liquid like behavior. In the palm roll-in fat the tan delta, which is the ratio of G"/G' was much higher at higher frequency range than in the reduced saturate treatments. This indicates a relatively more solid like structure with 20% and 30% saturate reduction in the presence of a 2% lecithin organogel.

Example 7

Puff pastries were made with the Organogel 1 of Example 1 using the formulations of Table 7. The control included 100% palm oil and three formulations replaced a portion of the palm oil with 2% Organogel 1 and soybean oil (SBO) at 10, 20, and 30% per Table 7. The all fat system was made using a stir-down process to simulate votation. A good enhancement of the lamination performance was observed with the three formulations including the Organogel 1.

TABLE 7

Puff pastry treatments with structured fat systems.

| Ingredient | 100% palm oil Control | 88% palm oil, 10% SBO, 2% organogel 1 | 76% palm oil, 20% SBO, 2% organogel 1 | 68% palm oil, 30% SBO, 2% organogel 1 |
|---|---|---|---|---|
| GOLDENHAWK brand Flour (ADM Milling, Overland Park, KS) | 38.31% | 38.31% | 38.31% | 38.31% |
| All purpose shortening (ADM 101-050) | 3.83% | 3.83% | 3.83% | 3.83% |
| salt | 0.38% | 0.38% | 0.38% | 0.38% |
| Cold (35-40° F.) water | 22.98% | 22.98% | 22.98% | 22.98% |
| Roll-in pastry shortening | 34.48% | 34.13% | 33.79% | 34.13% |

FIG. 9 shows the height of the puff pastry squares produced in this Example and shows that in puff pastries including the organogels of the present invention, the organogels are able to act as a structurant for the oil as evidenced by the enhanced lamination performance of the shortening when the palm oil is replaced by 10-30%.

Example 8

Pita chips were coated with high oleic oil as a control and an oil containing 5% Organogel 1 from Example 1 loaded with 200 ppm of ascorbic acid and 200 ppm of green tea extract as antioxidants. The antioxidants were loaded into the organogel. The Oxidative Stability Index (OSI) times of the chips were used to measure the stability for a period of six months using a Food Stability Analyzer. The Food Stability Analyzer (FSA or OSI-II) can be used to analyze the effects of whole food systems (such as proteins, acids, water) on the oxidative stability of the lipid system. The Food Stability Analyzer measures the rate of oxygen absorption from the headspace of a sample vial and quantifies the degree/rate of oxidation. The given amount of a pre-weighed sample of Pita chips were ground before being loaded into the cell of the Food Stability Analyzer. The OSI of the control pita chips and pita chips coated with the antioxidant loaded organogel is shown in FIG. 10.

The presence of the antioxidants shows that the shelf life of the Pita Chips can extended by loading polar antioxidants in the organogel in the oil used for coating.

Example 9

Crème fillings were produced using the formulations of Table 8 to evaluate the ability of the organogels of the present invention to reduce saturated fat. The Organogel 1 of Example 1 was used in this Example.

TABLE 8

Crème filling formulations.

| Description | Control | 25% Saturates Reduction |
|---|---|---|
| Sugar, Powdered | 31.82 | 31.82 |
| ADM All Purpose Palm Shortening ST 101-640 | 26.36 | — |
| ADM All Purpose Palm Shortening ST 101-640 with SBO and Organogel (2%) (Votated) 25% sat. reduction | — | 26.36 |
| Stabilizer (83% moisture) | 20.0 | 20.0 |
| ADM 42/43 Corn Syrup | 14.43 | 14.43 |
| Water | — | — |
| Nonfat Dry Milk, Extra Grade, | 6.64 | 6.64 |
| Salt | 0.28 | 0.28 |

TABLE 8-continued

Crème filling formulations.

| Description | Control | 25% Saturates Reduction |
|---|---|---|
| Flavor Natural WONF Vanilla extract | 0.28 | 0.28 |
| Potassium Sorbate | 0.20 | 0.20 |
| Total | 100 | 100 |

The crème fillings were processed with an Oakes Mixer (lab model 2MBT1A). The Oakes Mixer uses a gravity feed hopper to the pump. The crème fillings were processed to have a finished specific gravity target of 0.60-0.65 (the mixer settings were adjusted to deliver a target specific gravity, with a rotor speed of about 1000 rpm; a pump speed of about 30 rpm; air flow gauge of about 150; a back pressure of about 60-75 psi). The crème fillings were injected into finger cakes for sensory evaluation and weep testing was done on each crème filling at 30° C. and 35° C. The shortenings were simulated for votation by stir downs that were used to make the shortenings at 12.5%, 25%, and 33% saturate reduction. The control sample was very viscous, stiff, and difficult to inject through the finger cakes. The crème fillings including the organogels with the reduced saturates were easier to process and there was no weeping observed in the crème fillings produced with the organogels for the full shelf life of 32 days for the finger cakes.

Example 10

The ability of the organogels of the present invention to structure oils was evaluated. Palm stearine was used as a base stock to make mid and high blends with soybean oil (SBO). The control was 75:25 SBO to palm stearine. A mid ratio blend of 75% SBO, 20% palm stearine, and 5% organogel 1 of Example 1 and a high ratio blend of 70% SBO, 25% palm stearine, and 5% organogel 1 of Example 1 were produced by stir down to simulate a votation process.

The solid fat content (SFC) curves are shown in FIG. 11 and the rate of solidification as determined by NMR is shown in FIG. 12. The rate of solidification for the palm stearine blends including the organogel shows a slower rate of crystallization initially and over time exceeds the control. The variation of palm stearine in these blends including the organogel appeared to have no relation to the solidification rate, indicating some structuring.

A viscosity curve for the palm stearine blend including the organogel is shown in FIG. 13.

The viscosity data was monitored initially, at day 3, day 7, day 14, and day 21 to evaluate the effects of tempering. No post crystallization was observed with the addition of the organogels. For the equal amounts of the palm stearine at the 75:25 ratio of stearine to SBO, the blend with the organogel showed more structuring indicating the organogel was binding the liquid oil by bridging the liquid oil and fat system.

FIG. 14 shows the polarizing light microscopy (PLM) of the stearine blend including the organogel showing some spherulite structures that are small and well dispersed in the system. The smaller the spherulites, the higher the surface area, and the greater the interaction with the liquid oil which results in good oil binding in the presence of the organogels. The self assembled, lyotropic, liquid crystalline structure of the organogel itself having a high surface area may also have good oil binding properties.

The present invention has been described with reference to certain exemplary embodiments, compositions, and uses thereof. However, it will be recognized by those of ordinary skill in the art that various substitutions, modifications or combinations of any of the exemplary embodiments may be made without departing from the spirit and scope of the invention. Thus, the invention is not limited by the description of the exemplary embodiment, but rather by the appended claims as originally filed.

The invention claimed is:

1. A food product or ingredient comprising:
an edible organic phase; and
an edible thermo-reversible, structured phospholipid organogel composition;
wherein upon heating of the edible thermo-reversible, structured phospholipid organogel composition to a temperature between 30-40° C., the edible thermo-reversible, structured phospholipid organogel composition melts and wherein upon cooling of the melted edible thermo-reversible, structured phospholipid organogel composition to a temperature of below 30° C., the edible thermo-reversible, structured phospholipid organogel composition reforms to the shape of a gel.

2. The food product or the food ingredient of claim 1, wherein the edible thermo-reversible, structured phospholipid organogel composition provides structure to the edible organic phase.

3. The food product or the food ingredient of claim 1, wherein the edible thermo-reversible, structured phospholipid organogel composition comprises: an edible phospholipid composition; an organic phase selected from the group consisting of an edible oil, a food-grade emulsifier, a fatty acid ester, or any combinations thereof; an edible water soluble polymer; and an edible polar phase.

4. The food product or the ingredient of claim 3, wherein the edible phospholipid composition comprises less than 90% phosphatides, less than 30% phosphatidyl choline, or between 10-95% phosphatidyl choline.

5. The food product or the ingredient of claim 3, wherein the edible water soluble polymer is selected from the group consisting of xanthan gum, gellan gum, cellulose, a modified cellulose product, starch, chitin, carrageenan, gum arabic, an alginate, gum acacia, guar gum, agar, gelatin, locus bean gum, inulin, maltodextrin, resistant maltodextrin, pectin, beta glucans, and combinations of any thereof.

6. The food product or the ingredient of claim 3, wherein the edible water soluble polymer is mixed with an emulsifier.

7. The food product or the food ingredient of claim 1, wherein the edible organic phase comprises an edible oil, a food-grade emulsifier or a combination thereof.

8. The food product of the food ingredient of claim 1, wherein the food product is selected from the group consisting of a baked food, a crème, a filling, a coating, a compound coating, a shortening, a margarine, a baking fat, an icing, a frozen confection, chocolate, a beverage, a snack coating, a spread, a puff pastry, mayonnaise, a dressing, a sauce, a creamer, a yogurt, a dairy product, a cereal coating, a delivery vehicle for actives, a delivery vehicle for enzymes, a delivery vehicle for flavors, a delivery vehicle for a color, a clouding agent, or an emulsion stabilizer.

9. The food product or the ingredient of claim 1, wherein the edible thermo-reversible, structured phospholipid organogel composition further comprises a monoglyceride.

10. The food product or the ingredient of claim 3, wherein the edible polar phase is selected from the group consisting of water, glycerol, propylene glycol, isosorbide, isosorbide derivatives, sorbitol, erythritol, carbohydrates, high HLB emulsifiers, a polyhydric alcohol, and combinations of any thereof.

11. The food product or the ingredient of claim 1, further comprising a preservative.

12. A composition comprising:
a fat or an oil; and
an edible thermo-reversible, structured phospholipid organogel composition;
wherein the edible thermo-reversible, structured phospholipid organogel composition provides structure to the fat or the oil;
wherein upon heating of the edible thermo-reversible, structured phospholipid organogel composition to a temperature between 30-40° C., the edible thermo-reversible, structured phospholipid organogel composition melts and wherein upon cooling of the melted edible thermo-reversible, structured phospholipid organogel composition to a temperature of below 30° C., the edible thermo-reversible, structured phospholipid organogel composition reforms to the shape of gel.

13. The composition of claim 12, further comprising a second fat or a second oil.

14. The composition of claim 12, further comprising a flavoring.

15. The composition of claim 14, wherein the flavoring is selected from the group consisting of cocoa powder, cocoa butter, cocoa liquor, a vanilla flavoring, and combinations of any thereof.

* * * * *